United States Patent
Ontaneda

[11] Patent Number: 6,076,577
[45] Date of Patent: Jun. 20, 2000

[54] VEHICLE SUNSHADE

[76] Inventor: Guido Vinicio Ontaneda, 8717 Glen Echo Dr., Knoxville, Tenn. 37923

[21] Appl. No.: 09/241,895

[22] Filed: Feb. 1, 1999

Related U.S. Application Data

[63] Continuation of application No. 08/927,187, Sep. 11, 1997, abandoned.

[51] Int. Cl.[7] .................................................. B65D 65/02
[52] U.S. Cl. ................... 150/168; 160/370.21; 296/95.1
[58] Field of Search ..................... 150/154, 166, 150/168; 296/95.1; 60/370.21

[56] References Cited

U.S. PATENT DOCUMENTS

| | | |
|---|---|---|
| 2,608,198 | 8/1952 | Goodman . |
| 2,690,928 | 10/1954 | Boynes . |
| 2,718,912 | 9/1955 | Zimmerman . |
| 2,787,311 | 4/1957 | Cohen et al. . |
| 2,821,248 | 1/1958 | Irvine . |
| 3,042,111 | 7/1962 | Wytovich . |
| 3,401,977 | 9/1968 | Schamel . |
| 3,874,437 | 4/1975 | Black . |
| 4,209,197 | 6/1980 | Fischer . |
| 4,216,989 | 8/1980 | Tackett . |
| 4,355,839 | 10/1982 | Rosen . |
| 4,596,418 | 6/1986 | Koh . |
| 4,612,967 | 9/1986 | Kamen et al. . |
| 4,635,993 | 1/1987 | Hooper . |
| 4,842,324 | 6/1989 | Carden . |
| 4,948,191 | 8/1990 | Cao ........................................ 296/95.1 |
| 4,966,405 | 10/1990 | Tremaine et al. . |
| 4,972,892 | 11/1990 | Yeh . |
| 5,188,417 | 2/1993 | Curchod . |
| 5,292,167 | 3/1994 | Hellman . |
| 5,356,191 | 10/1994 | Sheehan . |
| 5,364,156 | 11/1994 | Zerow ................................ 296/95.1 X |
| 5,497,819 | 3/1996 | Chiang ................................ 296/95.1 X |
| 5,611,501 | 3/1997 | Crandley . |

*Primary Examiner*—Allan N. Shoap
*Assistant Examiner*—Tri M. Mai
*Attorney, Agent, or Firm*—Luedeka, Neely & Graham, PC

[57] ABSTRACT

A vehicle cover provided by a sheet material having in inner and outer surface, a central section positionable adjacent at least a portion of the exterior of the windshield of the vehicle and first and second end sections connected to the central section of the sheet material at opposite ends thereof. The first end section is positionable adjacent at least a portion of the exterior of the window of the driver side door and the second end section is positionable adjacent at least a portion of the exterior of the window of the passenger side door. The first end section defines a first pocket adjacent an upper end thereof for receiving an upper corner of the driver side door for maintaining the first end section adjacent the exterior of the driver side door and the second end section defines a second pocket adjacent an upper end thereof for receiving an upper corner of the passenger side door for maintaining the second end section adjacent the exterior of the passenger side door.

5 Claims, 4 Drawing Sheets

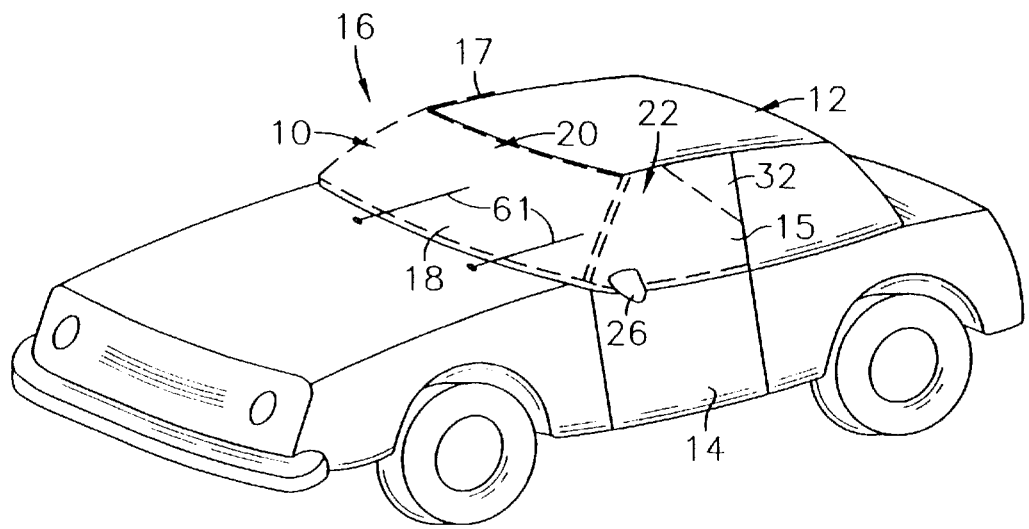
Fig. 1
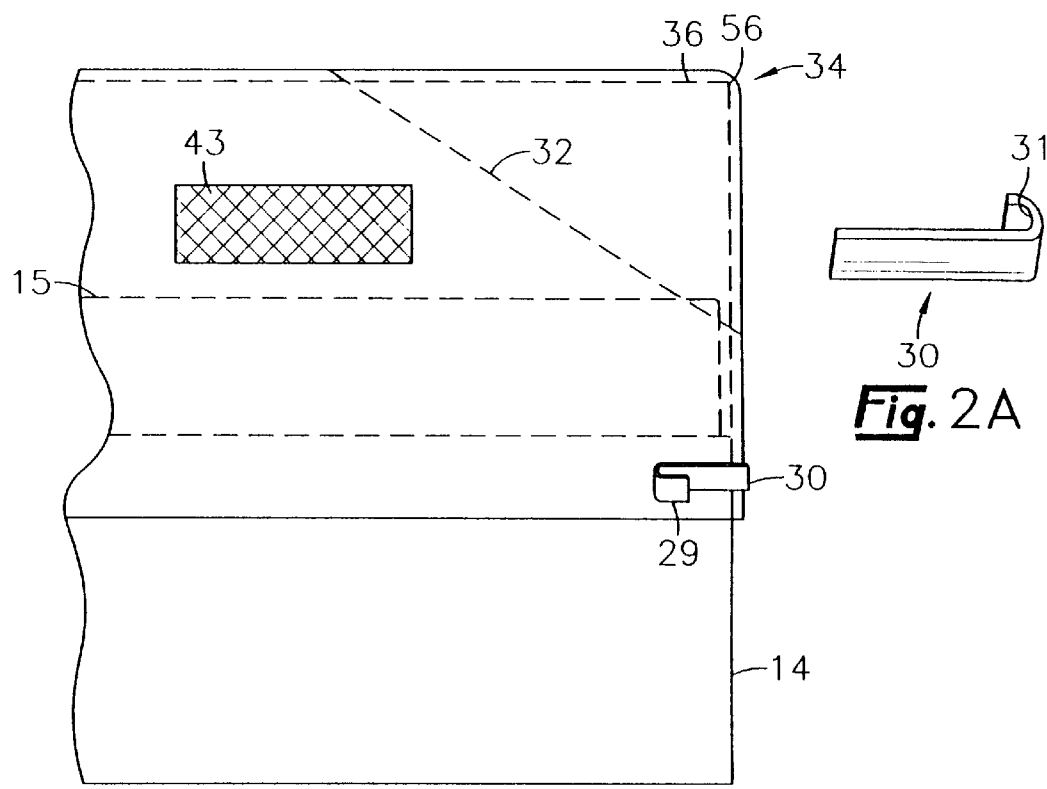
Fig. 2A
Fig. 2

VEHICLE SUNSHADE

This application is a continuation of application Ser. No. 08/927,187 filed Sep. 11, 1997 now abandoned.

FIELD OF THE INVENTION

This invention relates generally to covers for vehicles. More particularly, the invention relates to covers for exterior portions of vehicles to provide protection from the sun and other environmental factors.

BACKGROUND AND SUMMARY OF THE INVENTION

Sunlight is a common source of damage to vehicle interiors. For example, dashboards of vehicles exposed to direct sunlight on a consistent basis tend to fade and develop cracks. This deterioration is believed to be due not only to the light but also to solar heating of the interior of the vehicle.

Various internal and external covers are known in the art for shielding against sunlight. Such internal covers are generally less susceptible to theft as compared to external covers, but are disadvantageous in that they generally offer less protection in terms of area of coverage.

External covers offer increased protection from the sun and also offer protection against wind, snow, frost and other environmental factors. Typical external covers are disadvantageous in that they are susceptible to theft, are difficult to secure in place and are cumbersome, and tend to block the escape of heat from the interior of the car if used adjacent a window left partially open.

Accordingly, there is a need in the art for an external car cover suitable for providing protection from sun and other environmental factors which is less susceptible to theft as compared to prior devices and which inhibits sun from directly shining on the car interior and is suitable for use adjacent a partially open window of the vehicle for enabling heat to escape from the interior of the vehicle interior.

Accordingly it is an object of the present invention to provide an improved cover for use with vehicles to shield against damage from the sun and other environmental factors.

Another object of the present invention is to provide a cover of the character described which may be positioned on the exterior of an vehicle.

A further object of the present invention is to provide a cover of the character described which is less susceptible to theft a compared to conventional covers.

Still another object of the present invention is to provide a cover of the character described which is suitable for use adjacent a partially open window of the vehicle for enabling heat to escape from the interior of the vehicle interior.

An additional object of the present invention is to provide a cover of the character described which is inexpensive to produce and convenient to use.

Having regard to the foregoing and other objects, the present invention is directed to a cover for positioning adjacent an external portion of an vehicle having a windshield intermediate a driver side door including a window and a passenger side door including a window.

In a preferred embodiment, the cover includes a sheet material having in inner and outer surface, a central section positionable adjacent at least a portion of the exterior of the windshield of the vehicle and first and second end sections connected to the central section of the sheet material at opposite ends thereof. The first end section is positionable adjacent at least a portion of the exterior of the window of the driver side door and the second end section is positionable adjacent at least a portion of the exterior of the window of the passenger side door.

The first end section defines a first pocket adjacent an upper end thereof for receiving an upper corner of the driver side door for maintaining the first end section adjacent the exterior of the driver side door and the second end section defines a second pocket adjacent an upper end thereof for receiving an upper corner of the passenger side door for maintaining the second end section adjacent the exterior of the passenger side door.

BRIEF DESCRIPTION OF THE DRAWINGS

The above and other features and advantages of the present invention will become further known from the following detailed description when considered in conjunction with the accompanying drawings in which:

FIG. 1 is a perspective view of an vehicle having a cover in accordance with a preferred embodiment of the invention.

FIG. 2 is partial cross-sectional view of the cover of FIG. 1 showing installation of the cover over a door of the vehicle and FIG. 2a is an enlarged view of a hook used to secure the cover to the vehicle.

DETAILED DESCRIPTION

Figure 3:
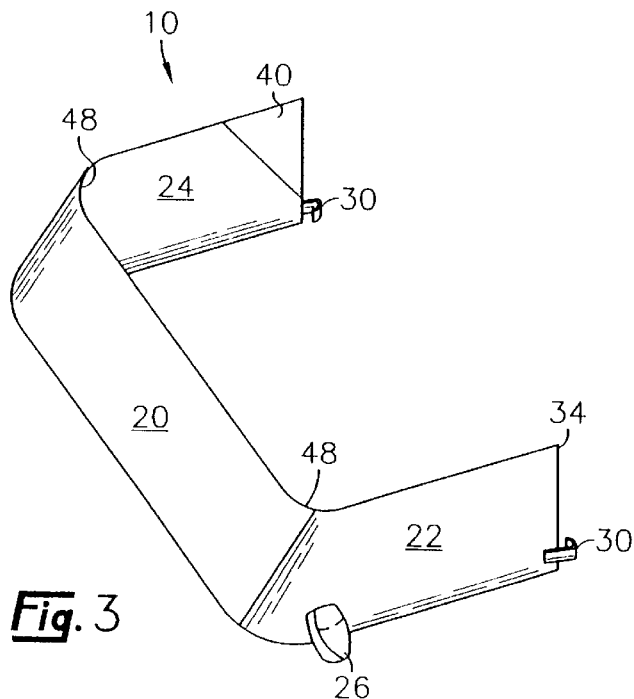
FIG. 3 is a perspective view of the cover of FIG. 1.

Referring now in more detail to the drawings, in which like numerals refer to like parts throughout the several views, and with initial reference to FIGS. 1 and 2, there is shown a cover 10 in accordance with a preferred embodiment of the present invention installed on a portion of the exterior of a typical vehicle 12 having a driver side door 14 having a window 15, a passenger side door 16 having a window 17, and a windshield 18.

Figure 4:
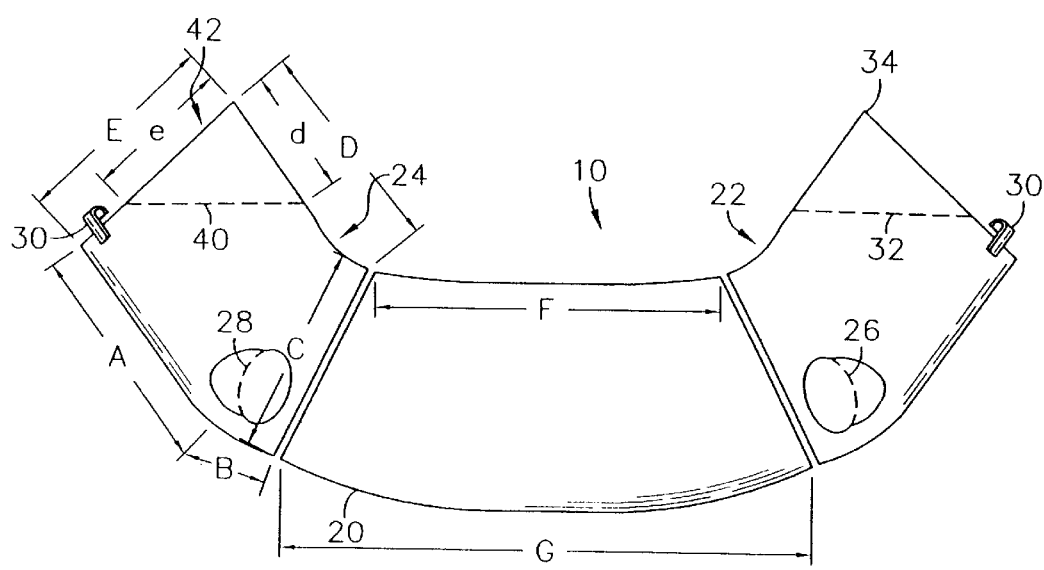
FIG. 4 is a front plan view of the cover of FIG. 3 showing the sections of the cover prior to assembly.

With reference now to FIGS. 3 and 4, the cover 10 is preferably provided by attaching, as by sewing, a central section 20 between a pair of end sections 22 and 24. The central section 20 is preferably configured to overlie the windshield 18 of the vehicle 12. End section 22 is preferably configured to overlie at least a portion of the exterior of the window 15 of the driver side door 14 and end section 24 is configured to overlie at least a portion of the exterior of the window 17 of the passenger side door 16. As will be appreciated, the end sections 22 and 24 may include pouches 26 and 28, respectively, to receive side view mirrors of the vehicle. and preferably extend to just below door handles 29 of the doors.

A hook 30 (FIG. 2a) is preferably attached, as by sewing, to the lower edge of each of the end sections 22 and 24 so that throat 31 of the hook 30 extends beyond the end section for engaging the edges of the doors 14 and 16 for maintaining the cover in place on the vehicle as will be explained in more detail below. As will be appreciated, the throat 31 of the hook 30 is sized to snugly receive the edge of the door. The hook is also preferably coated with a soft non-marring plastic material so as to not scar or scrape the finish on the door. Also, straps, magnets and other securing devices may be used in addition to or in place of the hooks 30.

A pocket 32 is preferably provided on upper outermost corner 34 of the end section 22 for receiving an upper corner 36 of the driver side door 14 for maintaining the end section 22 adjacent the exterior of the driver side door 14. Likewise, a pocket 40 is provided on upper outermost corner 42 of the end section 24 for receiving an upper corner of the passenger side door 16 for maintaining the end section 24 adjacent the exterior of the door 16.

The material used to provide the cover 10 (as well as the material used to provide the pockets 32 and 40) is preferably a single-layer (although multi-layer materials may be used) durable fabric material that is weather resistant and resistant to fading and tearing and is relatively lightweight. A particularly suitable material is nylon, preferably of the type used in the manufacture of flags.

In addition, it is preferred that the material be treated to resist penetration of light therethrough and have an SPF rating of at least about 30. It will be understood that the material may be dyed, woven or painted to include designs or other indicia. Also, it will be appreciated that one or more cutouts may be made in the end sections and a portion of breathable material, such as nylon screen 43, sewn in place. As will be appreciated, the screen 43 offers protection to the interior of the vehicle when the window is down yet also provides a ventilation path to provide a cooling effect to the interior of the vehicle.

Figure 5:
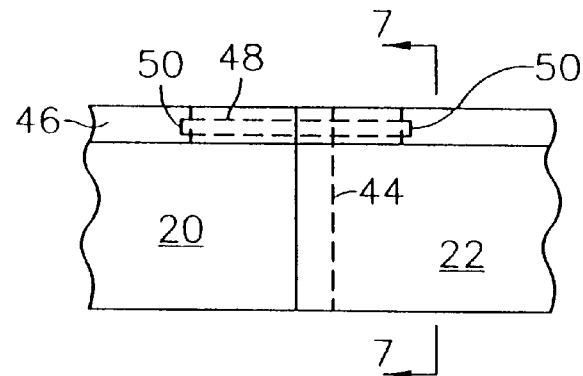
FIG. 5 is a partial view of the back of a portion of the cover in a stretched state.

With additional reference to FIGS. 4–7, the cover 10 is preferably assembled by attaching the center section 20 to the end sections 22 and 24. This is preferably accomplished by overlapping the center section 20 over the joining ends of the end sections 22 and 24 and sewn, glued or otherwise fastened to provide a seam 44 to join the overlapped portions (FIG. 5). In addition, the upper (and also preferably lower) edges of the sections 20–26 may be folded over and sewn to provide a hem 46. The hem 46 provides a neat border that is aesthetically pleasing and also resistant to fraying.

Figure 6:
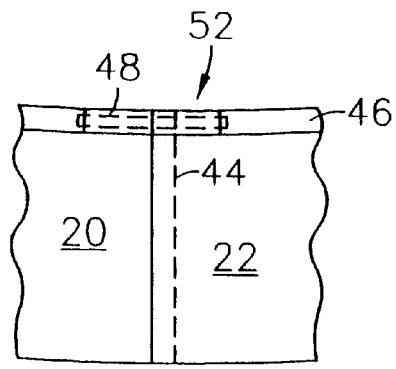
FIG. 6 is a view of the portion of the cover of FIG. 5 in a relaxed state.
Figure 7:
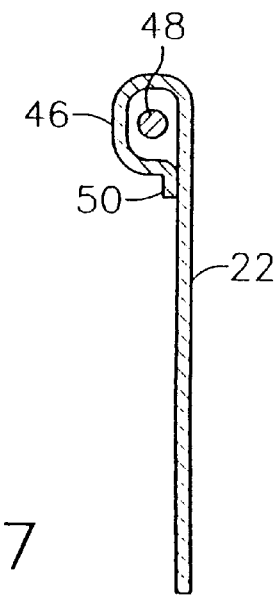
FIG. 7 is a cross-sectional view taken along line 7—7 of FIG. 5.

To enable the cover to closely conform to the contours of the vehicle, a length of elastic material 48, such as an elastic strip, is preferably provided within the pocket provided by the hem and the ends of the elastic material 48 secured as by stitches 50 in a less than fully stretched state. As shown in FIG. 6, the elastic material relaxes to a shortened length that creates a bunch 52 in the hem 46 along the length of the elastic material when the cover is not installed. Thus, as will be appreciated, the elastic material 48 further facilitates opening and closing of the automobile doors with the cover in place as may occur during installation and removal of the cover.

Figure 8:
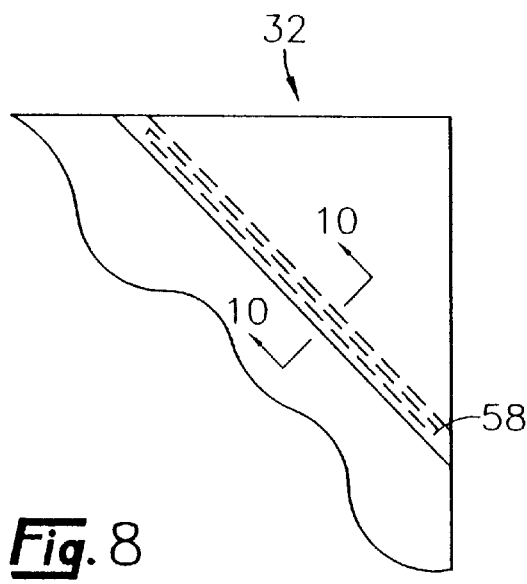
FIG. 8 is a partial view of the back of the cover showing a pocket.
Figure 9:
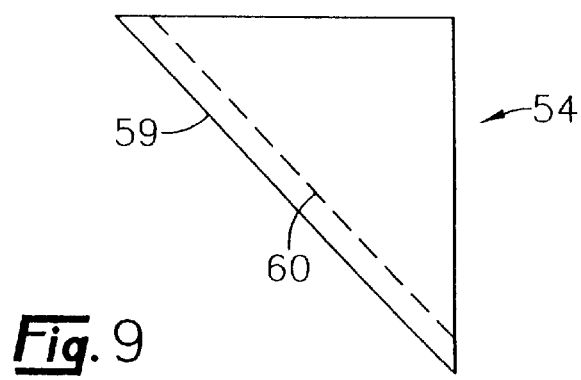
FIG. 9 is a top view of a component used to make the pocket of FIG. 9.
Figure 10:
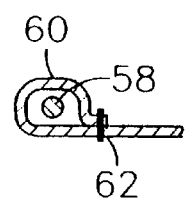
FIG. 10 is a cross-sectional view taken along line 10—10 of FIG. 8.

With additional reference now to FIGS. 8–10, the pocket 32 is preferably provided by a three-sided portion of material 54 (FIG. 9) secured, as by sewing, to the free edges of the corner 34. To protect against tearing of the material from contact with the corner 36 of the door 14, it is also preferred to provide extra material or a portion of padding 56 within the pocket 32 adjacent the corner 34. As will be understood from the dimensions provided in the example below, the sides of the pocket material 54 are preferably, but not necessarily, at least half that to the adjacent end section dimension so that the resulting pocket is sufficiently large to render theft of the cover significantly difficult.

To render the cover even more resistant to theft, a rod 58, preferably of a relatively soft material such as foam or cloth, may be provided adjacent the free edge 59 of the pocket material. However, a rigid material such as plastic, wood or metal may also be used for the rod 58. The rod 58 is preferably positioned within a hem 60 provided as by folding a portion of the free end over itself and securing using stitches 62 (FIG. 10). The rod 58 is difficult to pull through the joint between the closed door and the frame or body of the vehicle when the cover is in place.

The cover 10 may be installed by opening the door 14 and positioning the pocket 32 over the corner of the door and the hook 30 in engagement with the adjacent edge of the door, after which the door is shut to secure the end portion 22 of the cover in place. The central section 20 is then placed over the windshield and the end section 24 installed in a manner similar to that of the end section 22. If desired, windshield wipers 61 may be positioned over the central section 20, such as on windy days or at the beach, for additional securement of the cover. As will be appreciated, the cover is preferably sized such that the elastic straps 48 are in a slightly stretched state when the cover is installed so that the cover is tightly about the vehicle and conforms closely to the contours of the vehicle.

EXAMPLE

The following is an example of preferred dimensions of an assembled cover provided in accordance with the invention for a 1988 Mazda 323 no. automobile. Reference characters for the dimensions are provided in FIG. 4. As will be appreciated, the portions of the cover are slightly curved and the dimensions are the measured lengths along the material and not the chord length.

| A | B | C | D | d | E | e | F | G |
|---|---|---|---|---|---|---|---|---|
| 38" | 7" | 31" | 21" | 11" | 24" | 12" | 41" | 62" |

The foregoing description of certain embodiments of the present invention has been provided for purposes of illustration only, and it is understood that numerous modifications or alterations may be made without departing from the spirit and scope of the invention as defined in the following claims.

What is claimed is:

1. A cover for positioning adjacent an external portion of a vehicle having a windshield intermediate a driver side door including a window and a passenger side door including a window, said cover comprising:

a sheet material having an inner and outer surface, a central section configured so that when the cover is positioned adjacent the vehicle during use of the cover, the central section is positionable to overlie at least a portion of the exterior of the windshield of the vehicle, and first and second end sections connected to the central section of the sheet material at opposite ends thereof, said first end section being configured so that when the cover is positioned adjacent the vehicle during use of the cover, the first end section is positionable to overlie at least a portion of the exterior of the window of the driver side door and the second end section being configured so that when the cover is positioned adjacent the vehicle during use of the cover, the second end section is positionable to overlie at least a portion of the exterior of the window of the passenger side door;

said first end section defining a first pocket adjacent an upper end thereof for receiving an upper corner of the driver side door for maintaining said first end section adjacent the exterior of the driver side door and said second end section defining a second pocket adjacent an upper end thereof for receiving an upper corner of the passenger side door for maintaining said second end section adjacent the exterior of the passenger side door;

a first length of elastic material having one of its ends secured to a portion of the center section adjacent an upper edge of the center section and the other of its ends secured to a portion of the first end section adjacent an upper edge of the first end section;

a second length of elastic material having one of its ends secured to a portion of the center section adjacent an upper edge of the center section and the other of its ends secured to a portion of the second end section adjacent an upper edge of the second end section;

wherein the first and second lengths of elastic material are secured in a less than fully stretched state so that when the cover is positioned to overlie the windshield and first and second end sections during use of the cover, the first and second lengths of elastic material are stretchable to conform said cover tightly about and closely to exterior contours of the vehicle corresponding to the windshield and the passenger and driver side doors; and securing devices secured to lower edge portions of the first and second end sections and engagable with adjacent edge portions of the driver and passenger side doors for securing the lower edge portions of the first and second end sections adjacent edge portions of the driver and passenger side doors, respectively, to maintain the cover in a desired position.

2. The cover of claim 1, wherein said each securing device comprises a hook.

3. The cover of claim 1, wherein said first and second lengths of elastic material comprise first and second elastic straps.

4. A system, comprising:
(a) a vehicle having a windshield intermediate a driver side door including a window and a passenger side door; and
(b) a cover positioned adjacent an external portion of the vehicle for protecting the vehicle, the cover comprising a sheet material having an inner and outer surface, a central section configured to overlie the windshield and positioned adjacent at least a portion of the exterior of the windshield of the vehicle, and first and second end sections connected to the central section of the sheet material at opposite ends thereof, said first end section being configured so that it overlies at least a portion of the exterior of the window of the driver side door and the second end section being configured so that it overlies at least a portion of the exterior of the window of the passenger side door;

said first end section defining a first pocket adjacent an upper end thereof for receiving an upper corner of the driver side door for maintaining said first end section adjacent the exterior of the driver side door and said second end section defining a second pocket adjacent an upper end thereof for receiving an upper corner of the passenger side door for maintaining said second end section adjacent the exterior of the passenger side door; and a first length of elastic material having one of its ends secured to a portion of the center section adjacent an upper edge of the center section and the other of its ends secured to a portion of the first end section adjacent an upper edge of the first end section;

a second length of elastic material having one of its ends secured to a portion of the center section adjacent an upper edge of the center section and the other of its ends secured to a portion of the second end section adjacent an upper edge of the second end section;

wherein the first and second lengths of elastic material are secured in a less than fully stretched state so that when the cover is positioned to overlie the windshield and first and second end sections during use of the cover, the first and second lengths of elastic material are stretchable to conform said cover tightly about and closely to exterior contours of the vehicle corresponding to the windshield and the passenger and driver side doors.

5. The system of claim 4, wherein said first and second lengths of elastic material comprise elastic straps.

* * * * *